United States Patent [19]

McWilliam et al.

[11] Patent Number: 4,576,779

[45] Date of Patent: Mar. 18, 1986

[54] END CLOSURE MEMBER FOR A CONTAINER

[75] Inventors: Donald S. McWilliam, Ashton-in-Makerfield; David Minshall, Warrington, both of England

[73] Assignee: British Nuclear Fuels Limited, Warrington, England

[21] Appl. No.: 547,056

[22] Filed: Oct. 31, 1983

[30] Foreign Application Priority Data

Nov. 11, 1982 [GB] United Kingdom ............... 8232216

[51] Int. Cl.⁴ .............................................. G21F 5/00
[52] U.S. Cl. .................................... 376/203; 376/272; 220/345
[58] Field of Search ...................... 220/345, 346, 351; 250/506.1; 376/203, 272

[56] References Cited

U.S. PATENT DOCUMENTS 2,338,192  1/1944  Martin ................................. 220/346

FOREIGN PATENT DOCUMENTS 431770  6/1970  Australia .

Primary Examiner—Charles T. Jordan
Assistant Examiner—Richard Klein
Attorney, Agent, or Firm—William R. Hinds

[57] ABSTRACT

A closure in the form of a wedge-shaped member (3) to close the end of a container, such as a transport flask. The wedge-shaped member (3) carries a seal plate (7) which is urged by spring means (9) to project beyond the smaller end of the wedge-shaped member when the latter is in a position to open the end of the container. On advancing the wedge-shaped member (3) to close the end of the container the projecting end of the plate (7) first abuts against a stop (18) and continued advance of the wedge-shaped member relative to the seal plate (7) causes displacement of the seal plate towards the interior of the container to effect a seal at the end of the container.

5 Claims, 4 Drawing Figures

4,576,779

END CLOSURE MEMBER FOR A CONTAINER

BACKGROUND OF THE INVENTION

The present invention concerns a liquid-tight end closure member for a container, in particular for a nuclear fuel transport flask.

One form of flask for the transport of irradiated nuclear fuel comprises a cylindrical vessel closed at one end and having a removable closure member at its opposite end. The flask accommodates a bottle or magazine containing the fuel and in use the flask is upright with the removable closure member at its lower end whereby on removal of the closure member the bottle or magazine can be lowered out of the flask. As the bottle or magazine is filled with water it is necessary as a safety feature to ensure that the closure member effects a liquid-tight seal at the end of the flask.

FEATURES AND ASPECTS OF THE INVENTION

According to the present invention an end closure member for a container comprises a wedge-shaped member movable across the end of the container between open and closed positions, the wedge-shaped member carrying a seal plate on its inclined surface directed towards the interior of the container, and spring means for urging the seal plate to project outwardly beyond the smaller end of the wedge-shaped member when the latter is in its open position such that on advance of the wedge-shaped member into its closed position the projecting seal plate first contacts a stop and continued advance of the wedge-shaped member relative to the seal plate causes a displacement of the seal plate towards the interior of the container to effect a seal at the end of the container.

DESCRIPTION OF THE DRAWINGS

The invention will be described further, by way of example, with reference to the accompanying diagrammatic drawings; in which.

DESCRIPTION OF THE PREFERRED EMBODIMENT

Figure 1:
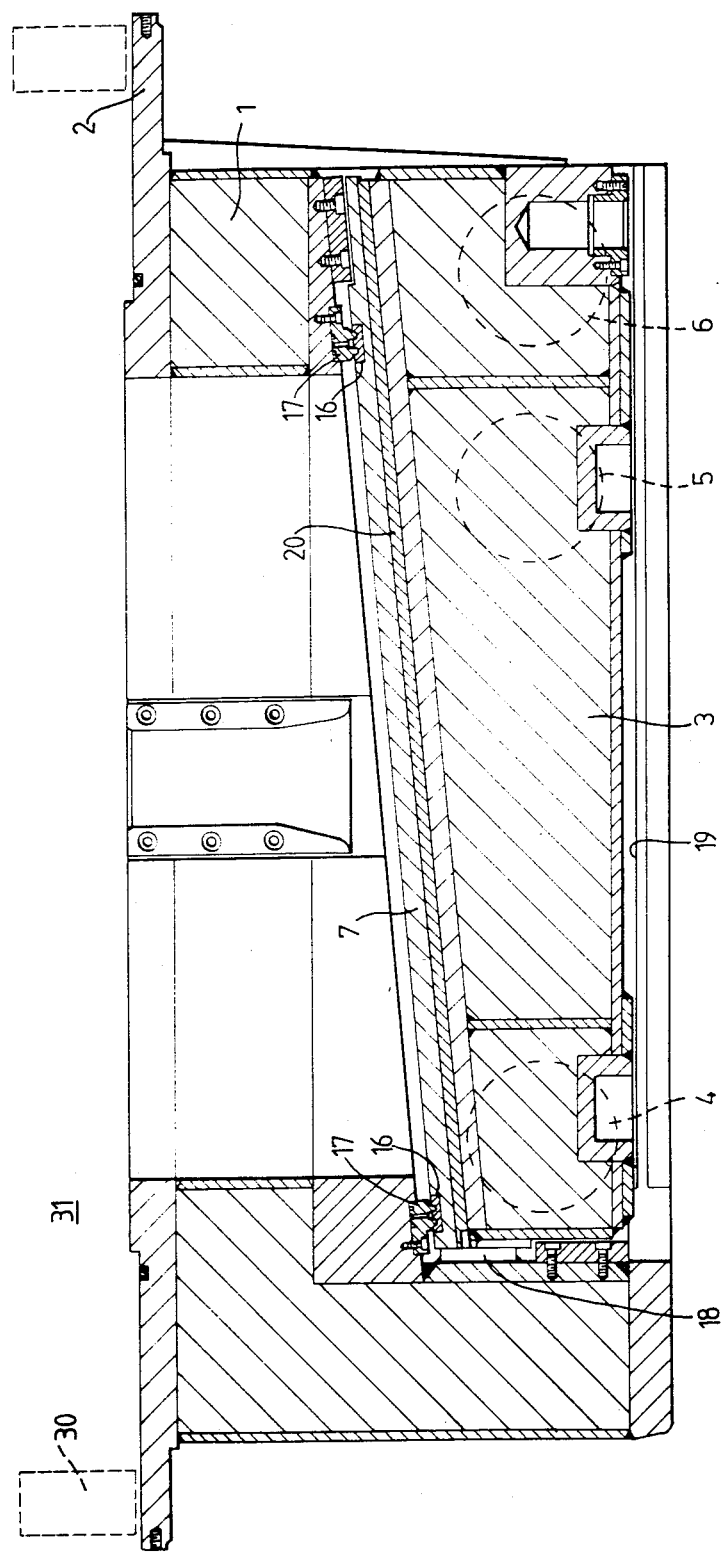
FIG. 1 is a sectional view of an end closure member when in a closed position in the base of a flask for nuclear fuel.

FIG. 1 shows a base 1 of a flask for the transport of irradiated nuclear fuel, the base 1 having a flange 2 whereby it can be bolted and secured to a corresponding flange at the end of the main body of the flask, (shown diagrammatically at 30 and having interior 31). The flask receives a bottle (not shown) containing the fuel and the base 1 is closed by a wedge-shaped member 3. It is necessary to ensure a liquid-tight seal at the wedge-shaped member 3. The member 3 can be releasably retained in its closed position shown in FIG. 1 by pegs or the like (not shown) mounted on the flask. The wedge-shaped member 3 is slidable into an open position in the manner of a drawer and for this purpose is provided with three pairs of wheels 4, 5 and 6 on opposite sides of the member 3 (only one set shown) which run on rails 19 mounted in the base of the flask. The intermediate pair of wheels 5 can be elevated slightly with respect to the pair of wheels 6 at the larger end of the wedge-shaped member 3, and are located adjacent the pair 6. This can assist in the movement on and off the ends of the rails 19.

Figure 2:
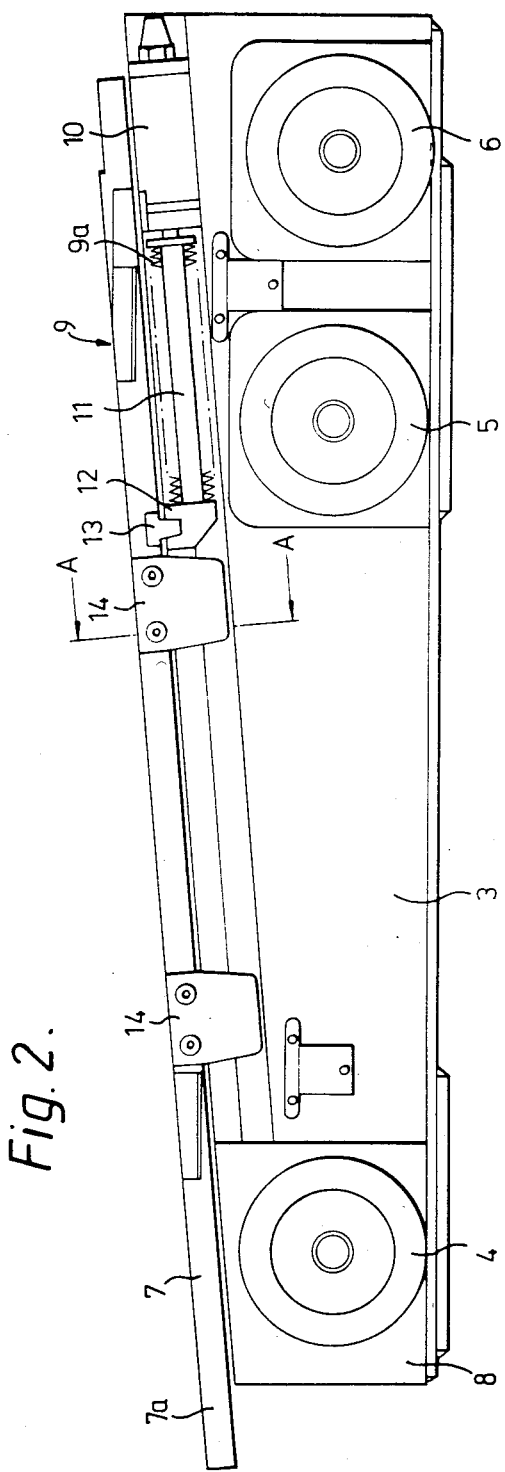
FIG. 2 is a view of the end closure member when withdrawn from the base of the flask.
Figure 3:
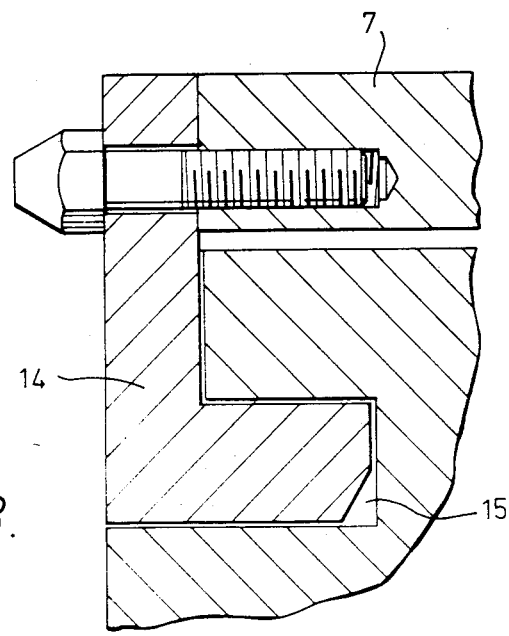
FIG. 3 is a section on the line A—A in FIG. 2 in enlarged scale.

With reference to FIGS. 2 and 3, the member 3 carries on its upper inclined surface a seal plate 7 which, when the member 3 is withdrawn from its closed position shown in FIG. 1, is urged to project beyond the shorter end 8 of the member 3 by means of two spring assemblies 9 arranged one at each side of the member 3. Each spring assembly 9 comprises a bush 10 which is anchored to the member 3 and is traversed by a push-rod 11. A block 12 at one end of the rod 11 engages a saddle 13 secured to the seal plate 7. Each spring assembly 9 conveniently comprises a disc spring 9a which is located about the push-rod 11 between the bush 10 and the block 12. The seal plate 7 is slidably located on the wedge member 3 by locating keys 14 at each side edge of the wedge member which respectively engage in grooves 15 in the member and as shown in FIG. 3. A bearing pad 20 is disposed between the wedge member 3 and the seal plate 7. With the wedge member 3 removed from the base of the flask, the seal plate 7 is urged by the spring assemblies 9 to project at 7a beyond the shorter end 8 of the wedge member 3 and as shown in FIG. 2.

Figure 4:
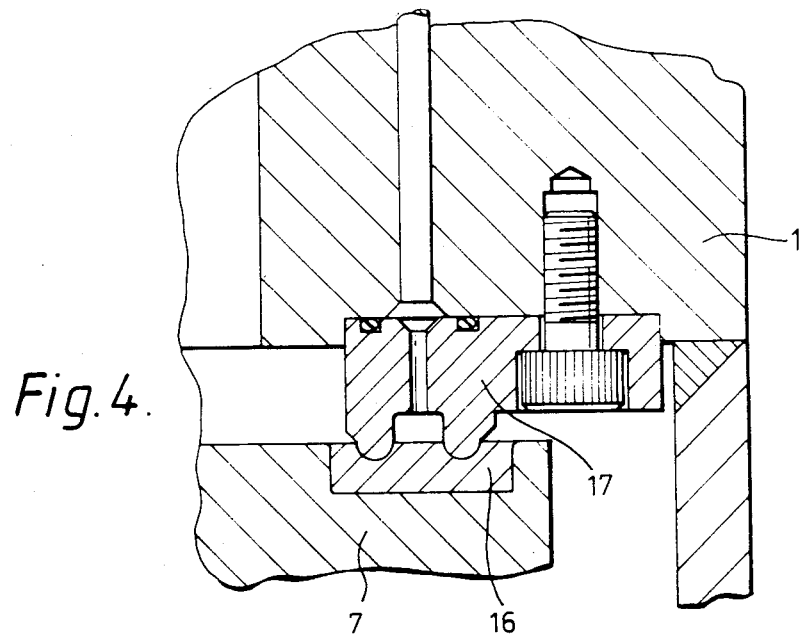
FIG. 4 is a detail of part of a seal for a sealing plate.

In use, the wedge member 3 carrying the seal plate 7 is introduced into the base in the manner of a drawer. The member 3 is advanced into the base until the projecting end 7a of the seal plate contacts a stop or abutment 18. Thereafter, continued advance of the wedge member 3 relative to the stationary seal plate 7 results in an upward displacement of the seal plate 7 to close the opening in the base 1 of the flask. As seen from FIG. 4, the seal plate 7 carries a seal 16 which cooperates with a sealing ring 17 secured about the opening in the base 1 of the flask. The upward displacement of the seal plate 7 by the final advance of the wedge member 3 presses the seal 16 firmly against the sealing ring 17 and effects a liquid-tight seal at the base of the flask. As the final movement of the seal plate 7 is upwards towards the base of the flask, the arrangement avoids scuffing and tearing of the seal 16 and the ring 17 which could otherwise occur upon relative sliding motion between these members.

We claim:

1. An end closure member for a container comprising, means defining an open end for a container, a wedge-shaped member movable across said end between open and closed positions, a seal plate on the inclined surface of the wedge-shaped member directed towards the interior of said end, means mounting said seal plate for relative movement along the path of the inclined surface of the wedge-shaped member, spring means for urging the seal plate to move to a position to project outwardly beyond the smaller end of the wedge-shaped member, and a stop cooperable with the seal plate such that on advance of the wedge-shaped member into its closed position the projecting seal plate first contacts the stop and continued advance of the wedge-shaped member relative to the stopped seal plate causes a displacement of the seal plate towards the interior of the container to effect a seal at said end, and on withdrawal of the wedge-shaped member toward its open position the seal plate is moved away initially from the end of the container before moving with the wedge-shaped member into the open position.

2. A closure member according to claim 1 including rails at said end to receive the wedge-shaped member.

3. A closure member according to claim 1 including locating keys on one of the seal plate and wedge-shaped member engageable in grooves in the other of the wedge-shaped member and seal plate to slidably locate the seal plate on the wedge-shaped member.

4. A closure member according to claim 1 including a seal on the seal plate and a cooperating seal ring at said end.

5. A closure member according to claim 1 in combination with a container which comprises a nuclear fuel transport flask.

* * * * *